United States Patent
Mizuguchi et al.

(10) Patent No.: US 7,991,301 B2
(45) Date of Patent: Aug. 2, 2011

(54) DETECTING ABNORMALITY IN AN OPTICAL RECEIVER

(75) Inventors: Noriaki Mizuguchi, Kawasaki (JP); Takashi Toyomaki, Kawasaki (JP); Yoshikazu Terayama, Kawasaki (JP); Kenichi Kaburagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 652 days.

(21) Appl. No.: 12/058,271

(22) Filed: Mar. 28, 2008

(65) Prior Publication Data
US 2008/0253761 A1 Oct. 16, 2008

(30) Foreign Application Priority Data
Mar. 29, 2007 (JP) ................... 2007-088805

(51) Int. Cl.
*H04B 10/00* (2006.01)
(52) U.S. Cl. .................. 398/208; 398/205; 398/212
(58) Field of Classification Search ........... 398/202–214
See application file for complete search history.

(56) References Cited

U.S. PATENT DOCUMENTS

| | | | | |
|---|---|---|---|---|
| 6,201,632 | B1 * | 3/2001 | Rollins ................... | 359/259 |
| 6,396,605 | B1 * | 5/2002 | Heflinger et al. ........... | 398/140 |
| 7,233,430 | B2 * | 6/2007 | Caplan .................... | 359/325 |
| 7,266,311 | B2 * | 9/2007 | Haunstein et al. ........... | 398/209 |
| 7,333,732 | B2 * | 2/2008 | Domagala ................. | 398/155 |
| 7,389,055 | B1 * | 6/2008 | Rickard et al. ............. | 398/206 |
| 7,411,726 | B2 * | 8/2008 | Caplan .................... | 359/325 |
| 7,477,848 | B2 * | 1/2009 | Ooi et al. ................. | 398/147 |
| 7,603,044 | B1 * | 10/2009 | Conroy et al. ............. | 398/202 |
| 7,676,162 | B2 * | 3/2010 | Isomura et al. ............. | 398/212 |
| 7,684,713 | B2 * | 3/2010 | Terayama et al. ........... | 398/208 |
| 7,715,720 | B2 * | 5/2010 | Shpantzer et al. ........... | 398/82 |
| 7,801,395 | B2 * | 9/2010 | Shpantzer et al. ........... | 385/14 |
| 7,840,143 | B2 * | 11/2010 | Calabro ................... | 398/203 |
| 2004/0081470 | A1 | 4/2004 | Griffin | |
| 2004/0141222 | A1 | 7/2004 | Miyazaki et al. | |

(Continued)

FOREIGN PATENT DOCUMENTS

JP 2004-170954 6/2004

(Continued)

OTHER PUBLICATIONS

R. A. Griffin, et al., "Optical Differential Quadrature Phase-Shift Key (oDQPSK) for High Capacity Optical Transmission", *Optical Fiber Communication Conference and Exhibit* 2002, OFP2002 Mar. 17-22, 2002, pp. 367-368.

*Primary Examiner* — Agustin Bello
(74) *Attorney, Agent, or Firm* — Staas & Halsey LLP

(57) ABSTRACT

An optical apparatus comprising: a branching unit branching an input light modulated by DQSPK format and thereby outputting a first branched light and a second branched light; a first branch and a second branch inputting the first branched light and the second branched light, respectively, the first branch and the second branch having an interferometer, a photo detector, and discriminator and demodulating I-signal and Q-signal, respectively; and an abnormality detection unit detecting an abnormality of the input light based on a synchronized detection of a first demodulated signal output from the photo detector in the first branch and a first recovered signal output from the discriminator in the first branch, and a synchronized detection of a second demodulated signal output from the photo detector in the second branch and a second recovered signal output from the discriminator in the second branch.

5 Claims, 12 Drawing Sheets

U.S. PATENT DOCUMENTS

| | | | |
|---|---|---|---|
| 2005/0260000 A1* | 11/2005 | Domagala | 398/188 |
| 2007/0047954 A1* | 3/2007 | Mamyshev | 398/33 |
| 2007/0122161 A1* | 5/2007 | Charlet et al. | 398/188 |
| 2008/0253761 A1* | 10/2008 | Mizuguchi et al. | 398/17 |
| 2009/0214226 A1* | 8/2009 | Mizuguchi et al. | 398/202 |
| 2009/0257758 A1* | 10/2009 | Sasaki | 398/214 |
| 2010/0003036 A1* | 1/2010 | Kuwata et al. | 398/183 |
| 2010/0135655 A1* | 6/2010 | Conroy et al. | 398/43 |

FOREIGN PATENT DOCUMENTS

| | | |
|---|---|---|
| JP | 2004-516743 | 6/2004 |
| JP | 2005-20277 | 1/2005 |
| JP | 2007-20138 | 1/2007 |
| WO | 02/51041 A2 | 6/2002 |
| WO | 02/51041 A3 | 6/2002 |
| WO | 2007/007864 A1 | 1/2007 |

* cited by examiner

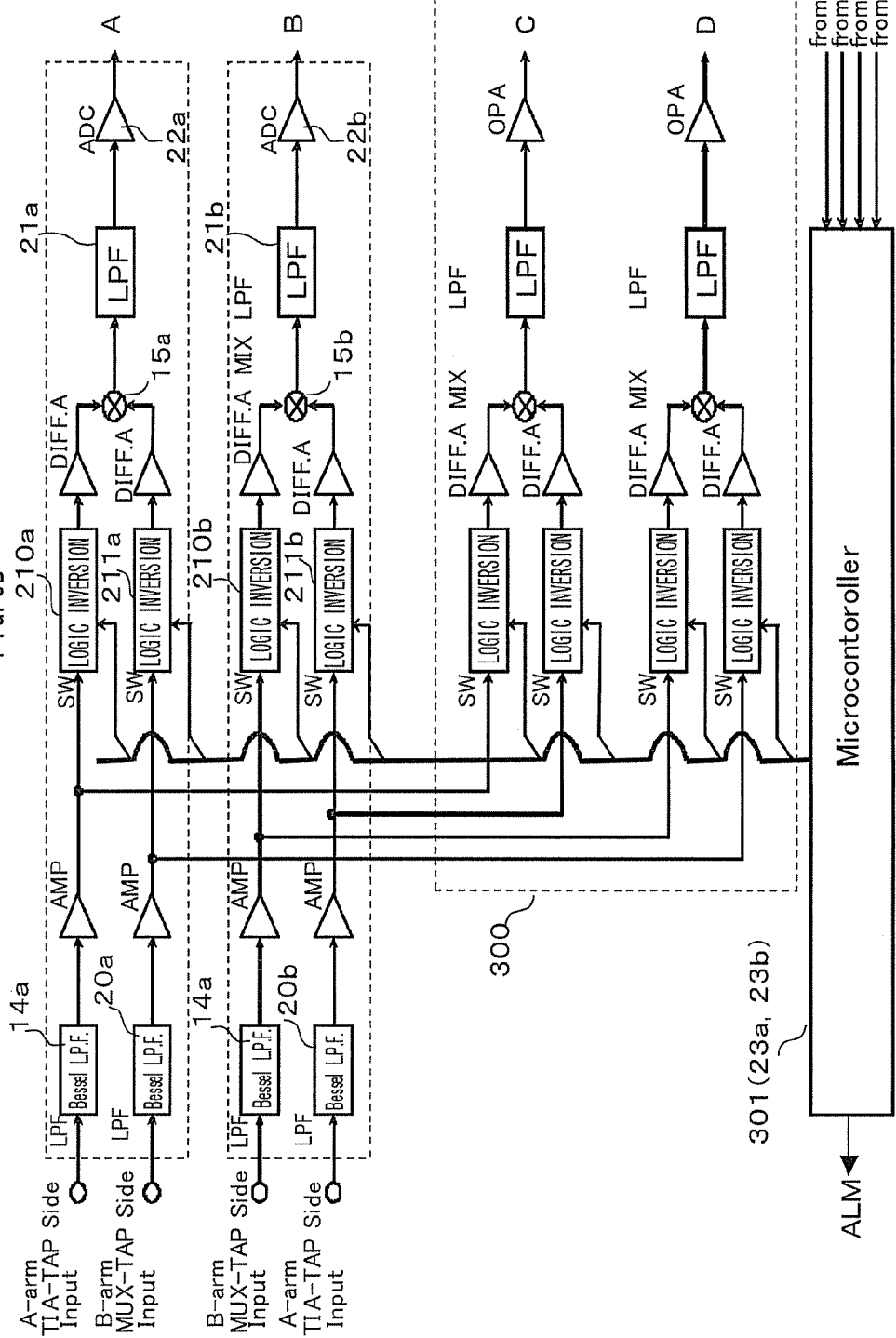

DETECTING ABNORMALITY IN AN OPTICAL RECEIVER

The present invention claims foreign priority to Japanese application 2007-088805, filed on Mar. 29, 2007, which is incorporated herein by reference in its entirety.

FIELD OF THE INVENTION

The present invention relates to an optical DQPSK (Differential Quadrature Phase Shift Keying) receiver and a control method of abnormality detection in the optical DQPSK receiver.

DESCRIPTION OF THE RELATED ART

In optical communication systems where the transmission capacity thereof has been rapidly increasing, a binary amplitude shift keying (also called as OOK: On-Off Keying) is mainly used as a way of a modulation format, which includes NRZ (Non-Return-to-Zero) modulation format or RZ (Return-to-Zero) modulation format.

Recently, some other modulation/demodulation schemes have been utilized in optical communication systems, such as a Duo-Binary modulation, a CSRZ (Carrier-Suppressed Return-to-Zero) modulation, a DPSK (Differential Phase Shift Keying) modulation.

In the DPSK modulation, data is modulated to a phase shift between two symbols adjacent to each other. In a binary DPSK modulation which utilizes two phase shifts, the phase shifts are 0 or $\pi$. A DPSK modulation utilizing four phase shifts of 0, $\pi/2$, $\pi$, and $3\pi/2$ is called as DQPSK (Differential Quadrature Phase Shift Keying) modulation.

Comparing with the conventional OOK modulation, DPSK modulation allows to improve an optical S/N ratio (OSNR: Optical Signal-to-Noise Ratio) by about 3 dB and to enhance an optical signal's resistance against nonlinear effects.

Since optical DQPSK utilizes a quaternary symbol, a spectral efficiency of the transmission is doubled to the OOK. That eases demands for speeds of electric devices, requirements for chromatic dispersion compensation, or requirements for polarization mode dispersion. Thus, optical DQPSK is a promising candidate of next generation optical communication systems.

A typical optical DQPSK receiver includes a set of Mach-Zehnder interferometers corresponding to an I-branch and Q-branch of DQPSK demodulation, as shown in "Optical Differential Quardrature Phase-Shift Key (ODQPSK) for High capacity Optical Transmission" by R. A. Griffin et al., Optical Fiber communication Conference and Exhibit, 2002. OFP2002 17-22 Mar. 2002 Pages 67-368. Each Mach-Zehnder interferometer includes an optical delay element $\tau$ which corresponds to a symbol time period in a transmission system.

The optical phase difference between the branches of an interferometer is set to be $\pi/4$ in the I-branch and $-\pi/4$ in the Q-branch. The two output terminals of each interferometer are connected to a balanced photo detector for regenerating transmitted data.

The configuration and operation of an optical DQPSK transmitter and receiver are also described in JP2004-516743 or WO2002/051041, for example.

FIG. 1 shows a configuration of a network of optical DQPSK using RZ format.

In FIG. 1, a narrow-band optical transmitter 1 inputs 21.5 Gbps of data 1 and data 2 from a DQPSK precoder 100 and thereby inputs the data into phase-shift modulators 120A, 120B respectively.

The phase-shift modulator 120A modulates a light from a light source 110 into a signal light with optical phases of 0 (rad) or $\pi$ (rad), according to the data 1. The phase-shift modulator 120B delays the light from the light source 110 by $\pi/2$ (rad) and modulates it into a signal light with optical phases of $\pi/2$ (rad) or $3\pi/2$ (rad), according to the data 2.

Signal lights output from the phase-shift modulators 120A and 120B are multiplexed to a DQPSK signal of 43 Gbps and the DQPSK signal is modulated with RZ intensity-modulation at an intensity modulator 130 into a RZ-DQPSK modulated signal and transmitted onto a network (optical transmission line) 3, as an optical phase modulated signal.

The optical signal output from the optical transmitter 1 propagates the optical transmission line (network) 3, which comprises a WDM (Wavelength Division Multiplexing) network. The network 3 includes a WDM multiplexing (WDM MUX) circuit 4, an optical amplifier AMP, and a demultiplexer 5 for WDM light, at some middle points.

The signal/noise ratio of the optical signal is degraded during amplification in the optical amplifier (AMP). Also, amount of chromatic dispersion of the optical signal increases in a long distance transmission by optical fiber. In order to compensate the chromatic dispersion, a dispersion compensator 6 is disposed in a fore-stage of the narrow-band optical receiver 2.

The narrow-band optical receiver 2 includes delay interferometers 200A and 200B, photodetectors (TWIN-PD) 210A and 210B, equivalent amplifiers 211A and 211B, discrimination circuits (clock and data recovery circuits; CDR) 220A and 220B, decoder 230, and an optical phase control circuit 240. Input optical signal are branched to delay interferometer 200A and 200B. In the delay interferometers 200A and 200B, input signals are further branched to two and one of the branched optical signal is shifted by 1-bit earlier and interferes with the other branched optical signal, of which optical phase is delayed by $\pi/4$ (rad), or $-\pi/4$ (rad), respectively. In the balanced photo detectors (TWIN-PD) 210A and 210B, the optical phase modulated signals output from the delay interferometer 200A and 200B, respectively, are subjected to differential optical/electrical conversion and converted electrical signals are subjected to an equivalent amplification in the equivalent amplifier 211A and 211B, respectively.

In the CDR 220A and 220B, the electrical signals output from the equivalent amplifier are converted to an I-channel signal and a Q-channel signal, respectively, and the CDR 220A and 220B work as the data recovery circuit. In decoder 230, the I-channel signal and the Q-channel signal are subjected to a bit swap logic inversion processing, which corresponds to the processing of the DQPSK precoder 100 in the optical transmitter 100.

In the receiver 2 of FIG. 1, it is important to keep the optical phase difference accurately at $\pi/4$ (rad) and $-\pi/4$ (rad) between the branches of the delay interferometer 200A and 200B, respectively. If the optical phase difference of the delay interferometer 200A or 200B becomes otherwise, waveform distortion of the output signal exceeds an allowable range. To keep the accurate optical phase difference, a feedback control is performed by an optical phase control circuit 240.

The optical phase control circuit 240 monitors a phase error detected in the receiver 2 and generates a phase adjustment signal that adjusts the phase of the interferometers so that the phase differences are maintained at a target value.

A typical feedback control method is known as a dither-peak-detection method. In this method, the phase shift added to the optical signal is slightly fluctuated at a frequency f and signal component with frequency 2f is monitored as an error signal. The 2f component of the error signal become minimized when the phase at the interferometers are maintained at a target value.

When the dither-peak-detection method is used in the optical phase control circuit 240 for controlling the delay of optical phase to be π/4 (rad) or −π/4 (rad) at the delay interferometers 200A and 200B, respectively, following problems arise.

First, fluctuating the phase causes a degradation of waveform distortion of the optical end electrical signal.

Second, the peak detection (detection of the above described minimum value) only indicates whether or not the phase is adjusted to the target value and does not indicate whether the target phase is larger or smaller than the target value.

Third, since a relation between the peak level of the detection signal and the phase error generally varies in a quadratic curve, the sensitivity of the peak detection signal against the phase to be adjusted is reduced as the phase error approaches to zero.

Fourth, the speed of phase control is restricted by the fluctuation frequency (frequency f in the description above).

FIG. 2 shows a configuration of theoptical DQPSK receiver of the embodiment, also described in a Japanese patent application of JP2005-305052, now published as JP2007-20138 (prior application). In FIG. 2, one of the two branches, I-branch and Q-branch, is referred to as an A-branch, and the other is referred to as a B-branch.

In FIG. 2, an input DQPSK signal (or RZ-DQPSK signal) is branched and directed to a delay interferometer 11a in the A-branch and a delay interferometer 11b in the B-branch.

In the delay interferometers 11A and 11B, input signals are further branched to two. The delay interferometers 11a and 11b include an optical delay element and a phase-shift element, respectively, and one of the branched optical signal is shifted by 1-bit earlier by the phase shift element and interferes with the other branched optical signal, of which optical phase is delayed by π/4 (rad), or −π/4 (rad) by the delay element, respectively.

In FIG. 2, the phase-shift amount of the phase-shift element is adjusted by its temperature. For example, as the temperature of the phase-shift element rises, its phase-shift amount increases.

The photo detection circuits (Twin-PD) 12a and 12b generate current signals corresponding to the optical phase modulated signals output from the delay interferometer 11a and 11b, respectively. Trans-impedance amplifiers (TIA) 13a and 13b convert the electric signal currents generated by the photo detection circuits 12a and 12b, respectively, into electric signals with a corresponding voltage level and limiter amplifier (LIA) 16a and 16b amplify the electric signals, respectively.

In the discrimination circuits (clock and data recovery circuits; CDR) 17a and 17b, the electrical signals output from the LIA 16a and 16b, respectively, are converted to an I-channel signal and a Q-channel signal, respectively, which work as clock and data recovery circuits.

Optical phase error detection unit IA includes low-pass filters (LPF) 14a, 20a, and 21A, a mixer 15a, and AD converter 22a. An electric signal output from the TIA 13a is provided to a mixer 15a through the low-pass filter 14a. Also, an electric signal output from the CDR 17b is provided to the mixer 15a through the low-pass filter 20a.

Similarly, optical phase error detection unit IB includes low-pass filters 14b, 20b, and 21b, a mixer 15b, and AD converter 22b. An electric signal output from the TIA 13b is provided to the mixer 15b through the low-pass filter 14b. Also, an electric signal output from the CDR 17a is provided to the mixer 15b through the low-pass filter 20b.

The cut-off frequencies of the low-pass filters 14a, 14b, 20a, and 20b are for example about 100 MHz.

In the optical phase error detection unit IA, the mixer 15a multiplies output signals of the low-pass filter 14a and the low-pass filter 20a. Similarly, in the optical phase error detection unit IB, the mixer 15b multiplies the output signals of low-pass filter 14b and the low-pass filter 20b.

High frequency components of electrical signals output from the mixers 15a and 15b are eliminated by the low-pass filters 21a and 21b, respectively. An A-branch monitor signal and a B-branch monitor signal output from the low-pass filters 21a and 21b, respectively, are converted into a digital data by A/D converters (ADCs) 22a and 22b, respectively.

Thus, in the optical phase error detection unit IA, the mixer 15a multiplies the electric signal not processed by CDR 17a in the A-branch and the electric signal processed by CDR 17b in the B-branch. Similarly, in the optical phase error detection unit IB, the mixer 15b multiplies the electric signal not processed by CDR 17b in the B-branch and the electric signal processed by CDR 17a in the A-branch.

A microcontroller 23a calculates a digital signal output from the A/D converter 22a and generates a phase adjustment signal for the A-branch. Similarly, a microcontroller 23b calculates from a digital signal output from the A/D converter 22b and generates a phase adjustment signal for the B-branch. Details of the calculations are explained later. The microcontrollers 23a and 23b are not necessarily separated ones, and may be a common controller.

The phase adjustment signals generated by the microcontrollers 23a and 23b are converted into analog signals and provided to heaters 24a and 24b, respectively.

In the A-branch, temperature of a phase-shift element in the delay interferometer 11a is adjusted by the heater 24a controlled by the microcontroller 23a. In the B-branch, temperature of a phase-shift element in the delay interferometer 11b is adjusted by the heater 24b controlled by the microcontroller 23b. The temperatures of the phase shift elements in the interferometer 11a and the interferometer 11b are adjusted separately.

As phase-shift amounts of the phase-shift elements of the delay interferometers 11a and 11b depend on temperature, the phase-shift amounts of the phase-shift elements of the delay interferometers 11a and 11b are adjusted by the phase adjustment signals generated by the microcontrollers 23a and 23b, respectively.

A temperature detector 25 detects a temperature around the delay interferometers 11a and 11b. A temperature control circuit 26 generates a temperature control signal based on a detection result of the temperature detector 25. A Peltier device 27 changes the temperature around the delay interferometers 11a and 11b, based on the temperature control signal. As the temperature control circuit 26 generates the temperature control signal for maintaining the temperature around the delay interferometers 11a and 11b to a predetermined value, the Peltier device 27 maintains the temperature around the delay interferometers 11a, 11b at a predetermined temperature according to the temperature control signal.

The Peltier device 27 is used for supplemental temperature control device to control the temperatures of the phase-shift elements in the delay interferometers 11a and 11b. Therefore, if temperature control for the phase-shift amounts of the phase-shift elements in the delay interferometer 11a and 11b can be done only by the heaters 24a and 24b, respectively, temperature control is done without the temperature detector 25, the temperature control circuit 26, or the Peltier device 27.

In the optical DQPSK receiver shown in FIG. 2, when the phase error of the phase-shift element of the delay interferometer 11a is δA, the A-branch monitor signal is proportional to −sin(δA). Also, when the phase error of the phase-shift element of the delay interferometer 11b is δB, the B-branch monitor signal is proportional to −sin(δB).

Therefore, the microcontroller 23a controls the heater 24a such that the A-branch monitor signal output from the low-pass filter 21a becomes zero. Similarly, the microcontroller 23b controls the heater 24b such that the B-branch monitor signal output from the low-pass filter 21b becomes zero.

As described above, optical phase error detection unit IA and IB, including the mixers 15a and 15b, and the low-pass filters 21a and 21b, and the microprocessors 23a and 23b operate as a phase monitoring apparatus and a phase control apparatus.

In FIG. 2, the phases of light of the optical phase modulated signals in the A-branch (I-branch) and the B-branch (Q-branch) are orthogonal. In performing signal extraction separately from the A-branch and the B-branch, when the optical phase control of the delay interferometer 11a (11b) is maintained in a target state, a discrimination output component of the CDR 17a (or 17b) is not mixed into the output signal of the TIA 13b (or 13a) of the B (or A)-branch, and therefore the output of the optical phase error detection unit (output of the A/D converter 22b (or 22a)) will become 0 [V].

On the other hand, when the optical phase control of the delay interferometer 11a (11b) is deviated from the target state, a discrimination output component of the CDR 17a (or 17b) of the A (or B)-branch is mixed into the output signal of the TIA 13b (or 13a) of the B (or A)-branch, therefore, a +/− voltage will be generated at the output of the optical phase error detection unit IA (or IB) (output of the A/D converter 22b). This makes it possible to determine the phase-shift amount and its direction.

When there is no correlation between the A-branch and B-branch, the time integration value of the multiplication output of both the signals will converge to zero; however, when the output signal of the discrimination circuit 17a (or 17b) of the B (or A)-branch is mixed into the output signal of the trans-impedance amplifier 13b (or 13a) of the B (or A)-branch, the relation represented by the following equation holds.

That is, letting the output wp of the TIA 13b (or 13a), i.e. the signal not processed by CDR 17b (17a) of the B (or A)-branch be [B(A)-arm TIA OUT], and the signal output from the discrimination circuit 17b (17a), i.e. the signal processed by the CDR 17b (17a) be [A(B)-arm MUX OUT], the relation is represented as follows:

$$[B(A)\text{-arm TIA OUT}]=(n^*B(A)\text{-arm TIA OUT})+ (m^*A(B)\text{-arm MUX OUT})$$

Here, [B(A)-arm TIA OUT] is the signal to be primarily extracted, and [A(B)-arm MUX OUT] is the signal component which has been mixed. Further, n and m are coefficients generated by optical phase shifting.

Then, the output of the mixer 15a, 15b, [B(A)-arm TIA OUT×A(B)-arm MUX OUT] will be represented as follows.

$$[B(A)\text{-arm TIA OUT} \times A\text{-arm MUX OUT}]=(n^*B(A)\text{-arm TIA OUT}+m^*A(B)\text{-arm TIA OUT})\times A(B)\text{-arm MUX OUT}$$

$$=(n^*B(A)\text{-arm TIA OUT})\times(A(B)\text{-arm MUX OUT})+ (m^*A(B)\text{-arm TIA OUT})\times(A(B)\text{-arm MUX OUT})$$

Where, (n*B(A)-arm TIA OUT)×(A(B)-arm MUX OUT), which is the output of synchronized detection, is a term which is supposed to be zero by nature; and when control is deviated from a target state, the term (m*B(A)-arm TIA OUT)×(A(B)-arm MUX OUT) will not become zero (i.e. m will not be 0), but will generate a +/− voltage depending on the direction of the optical phase shift.

SUMMARY

An optical apparatus comprising: a branching unit branching an input light modulated by DQSPK format and thereby outputting a first branched light and a second branched light; a first branch and a second branch inputting the first branched light and the second branched light, respectively, the first branch and the second branch having an interferometer, a photo detector, and discriminator and demodulating I-signal and Q-signal, respectively; and an abnormality detection unit detecting an abnormality of the input light based on a synchronized detection of a first demodulated signal output from the photo detector in the first branch and a first recovered signal output from the discriminator in the first branch, and a synchronized detection of a second demodulated signal output from the photo detector in the second branch and a second recovered signal output from the discriminator in the second branch.

The above summary describes only an example embodiment. All embodiments are not limited to including all the features in this example.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

DESCRIPTION OF THE DRAWINGS

FIG. 3A and FIG. 3B are block diagrams showing a configuration of an embodiment;

DESCRIPTION OF THE PREFERRED EMBODIMENTS

Figure 1:
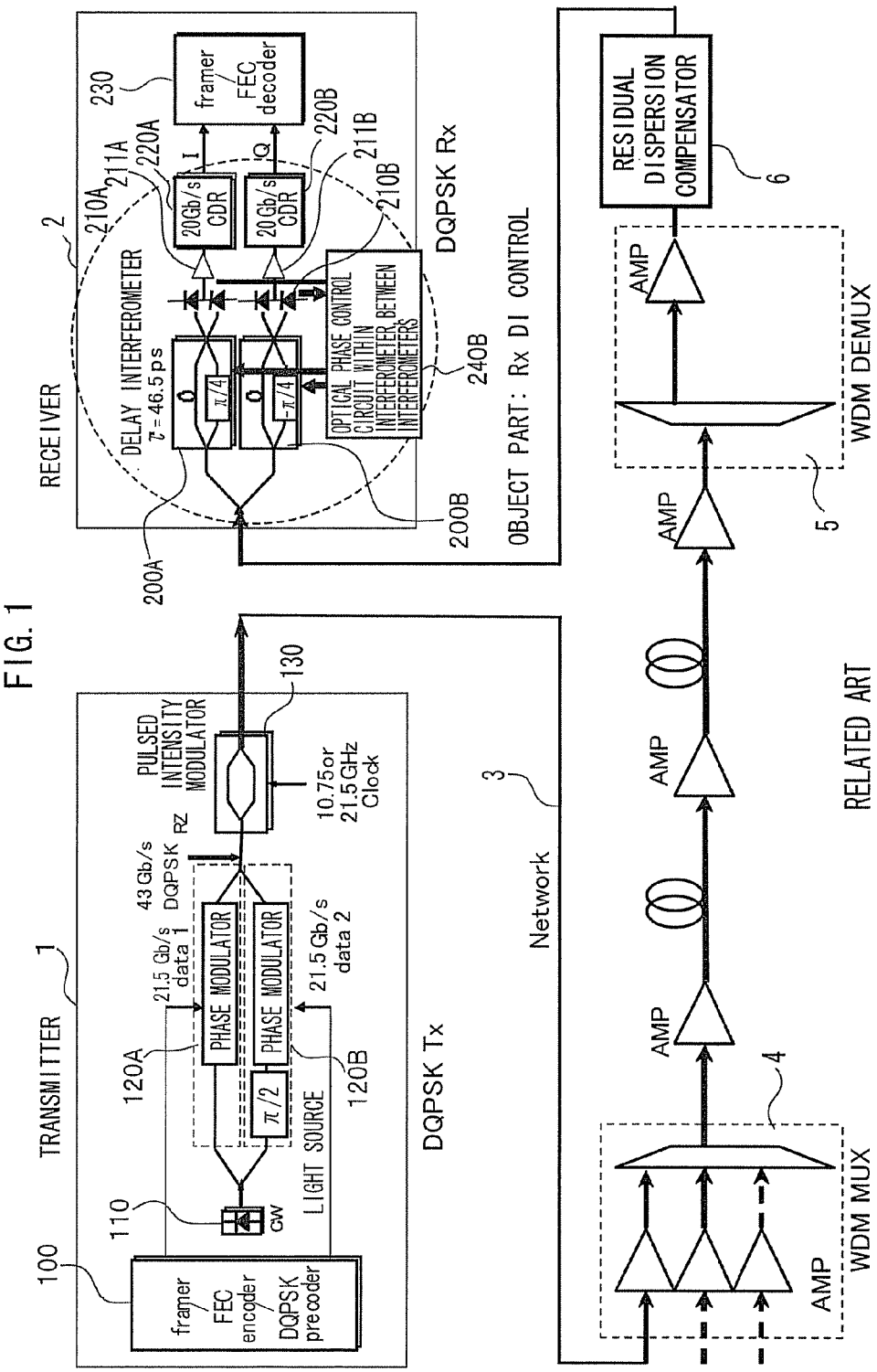
FIG. 1 shows a configuration of a network of optical DQPSK using RZ format in a related art.

Reference will now be made in detail to embodiments, examples of which are illustrated in the accompanying drawings, wherein like reference numerals refer to like elements throughout.

Figure 2:
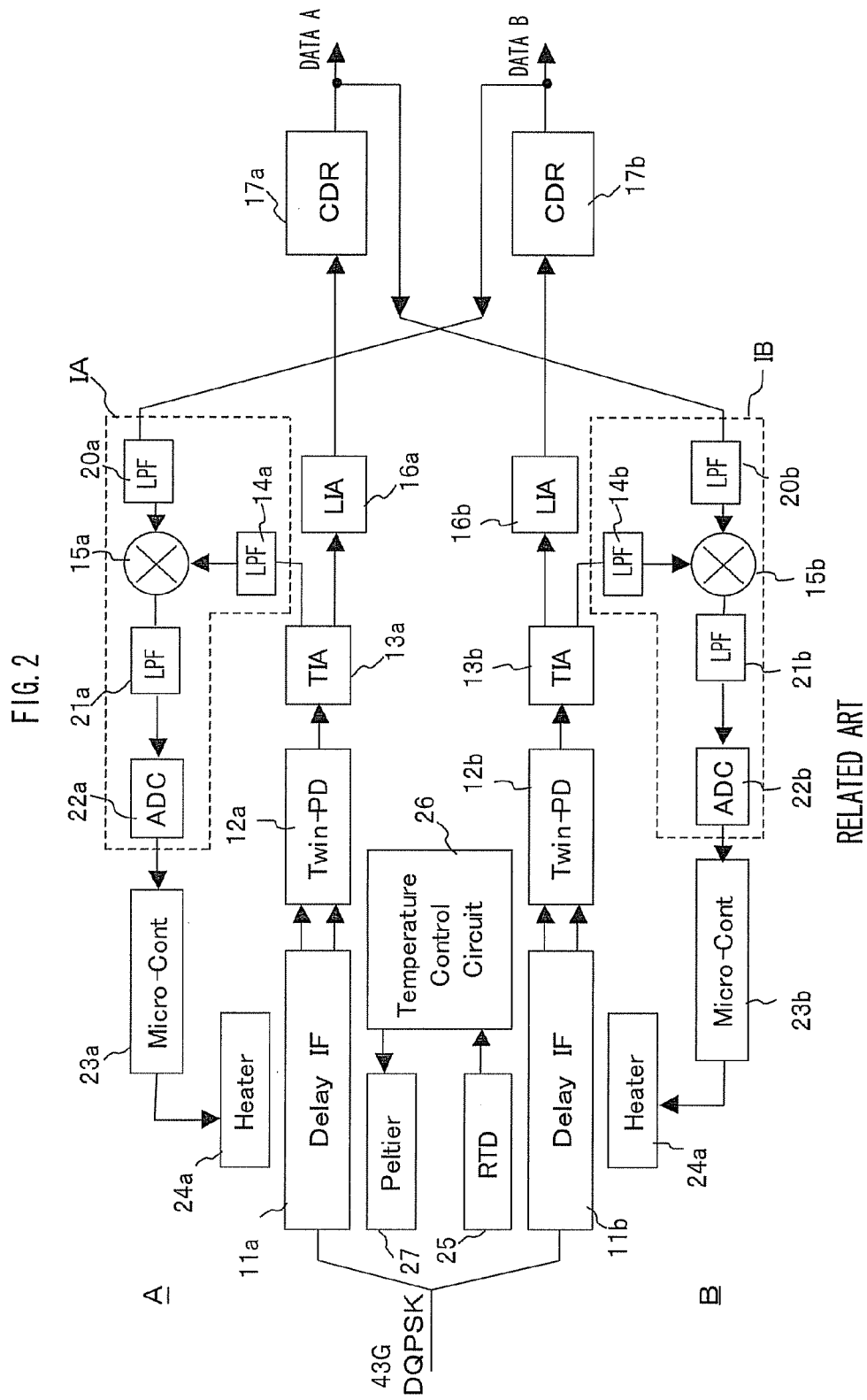
FIG. 2 shows a configuration of an optical DQPSK receiver in a related art.

In the configuration shown in FIG. 2, when the term (n*B(A)-arm TIA OUT)×(A(B)-arm MUX OUT), which generates a +/− voltage depending on the direction of optical phase shift, can not be detected, the feedback loop may not be able to function properly causing a runaway in the configuration of the invention of the prior application.

That is, in a normal sate in which the outputs of the TIA 13a, 13b and the outputs of the CDR 17a, 17b are at generally expected levels, the feedback control functions properly. On the other hand, when optical input state is abnormal, or when any one of the TIA 13a, 13b or the CDR 17a, 17b is in failure, the above described term (n*B(A)-arm TIA OUT)×(A(B)-arm MUX OUT), which generates a +/− voltage depending on the direction of optical phase shift, can not be detected so that the optical phase error detection value will become abnormal.

However, in the configuration shown in FIG. 2, when the term (n*B(A)-arm TIA OUT)×(A(B)-arm MUX OUT) cannot be detected, it cannot detect that the optical phase error detection value becomes abnormal.

Shown below are examples of the state in which the optical phase error detection value becomes abnormal.

Case 1: cases when the received optical input includes no optical phase modulated signal, such as an amplified spontaneous emission (ASE) light alone, or cases when the ratio of the signal light S and ASE light (A/ASE) is abnormally small to such an extant as not to be able to detect the above described term (n*B(A)-arm TIA OUT)×(A(B)-arm MUX OUT) by a predetermined amount, the detection of optical input disconnection becomes impossible; that is, in which optical input disconnection detection, thereby the detection of abnormalities, is disabled because of a large amount of ASE.

Case 2: cases when the distortion of the optical input signal is so large that the optical signal cannot be discriminated, and therefore MUX OUT of the above described term (n*B(A)-arm TIA OUT)×(A(B)-arm MUX OUT) is indeterminate.

As a bandwidth of the linear amplified signal (TIA OUT) is limited by the low-pass filter 14a, 14b in the optical phase error detection circuit unit IA or IB, the linear amplified signal has a large tolerance against a residual dispersion, relating to the distortion of the optical input signal.

Chromatic dispersion generated in the optical transmission line 3 is compensated by the dispersion compensator 6. As the control of the dispersion compensator 6 is performed in such a way to decrease the error correction rate in a signal communication state, when the delay interferometer optical phase control is abnormal and the optical signal cannot be discriminated, it is impossible to make a dispersion compensation and impossible to ensure a signal communication state.

Case 3: cases where the data discrimination circuit (CDR) 17a or 17b is abnormal. An abnormality of the data discrimination circuit 17a, 17b will cause errors due to the discrimination errors of phase shift of the data and the clock. In such a case, (MUX OUT), which is the discrimination circuit output of the above described term (n*B(A)-arm TIA OUT)×(A(B)-arm MUX OUT), becomes indeterminate and thus optical phase error detection values cannot be obtained, as occurred in Case 2.

Case 4: cases when any one of the TIA 13a, 13b and CDR 17a, 17b is abnormal, the above described term (n*B(A)-arm TIA OUT)×(A(B)-arm MUX OUT) cannot be detected regardless of the optical phase control value.

Case 5: cases when optical input is disconnected and the output signals of TIA 13a, TIA 13b, CDR 17a, and CDR 17b become indeterminate. That makes it impossible to obtain the optical phase error detection value. And it is also the case in which optical input disconnection detection, thereby the detection of abnormalities is disabled due to circuit abnormalities and the like.

Figure 3A:
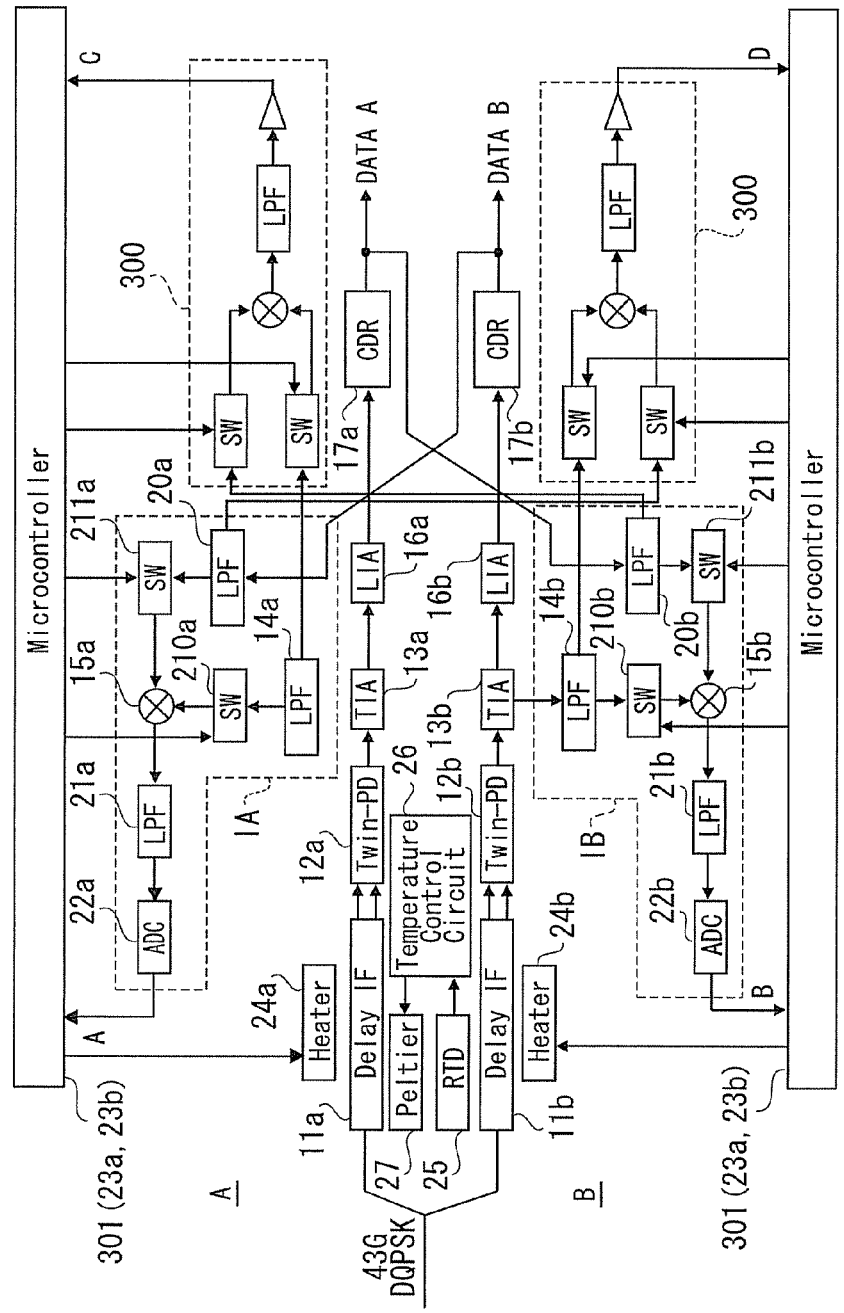

FIG. 3A and FIG. 3B are block diagrams showing a configuration of an embodiment. FIG. 3A shows an optical receiver of the embodiment and FIG. 3B shows a detailed configuration of the optical phase error detection units IA and IB, surrounded by a dotted line in FIG. 3A, and an abnormal state detection unit 300.

In FIG. 3A, an input DQPSK signal (or RZ-DQPSK signal) is branched and directed to a delay interferometer 11a in the A-branch and a delay interferometer 11b in the B-branch.

In the delay interferometers 11A and 11B, input signals are further branched to two. The delay interferometers 11a and 11b include an optical delay element and a phase-shift element, respectively, and one of the branched optical signal is shifted by 1-bit earlier by the phase shift element and interferes with the other branched optical signal, of which optical phase is delayed by π/4 (rad), or −π/4 (rad) by the delay element, respectively.

In FIG. 3A, the phase-shift amount of the phase-shift element is adjusted by its temperature. For example, as the temperature of the phase-shift element rises, its phase-shift amount increases.

The photo detection circuits (Twin-PD) 12a and 12b generate current signals corresponding to the optical phase modulated signals output from the delay interferometer 11a and 11b, respectively. Trans-impedance amplifiers (TIA) 13a and 13b convert the electric current signals generated by the Twin-PD 12a and 12b, respectively, into electric signals with a corresponding voltage level and limiter amplifier (LIA) 16a and 16b amplify the electric signals, respectively.

In the discrimination circuits (clock and data recovery circuits; CDR) 17a and 17b, the electrical signals output from the LIA 16a and 16b, respectively, are converted to an I-channel signal and a Q-channel signal, respectively, which work as clock and data recovery circuits.

Optical phase error detection unit IA includes low-pass filters (LPF) 14a, 20a, and 21A, a mixer 15a, and AD converter (ADC) 22a. An electric signal output from the TIA 13a (first demodulated signal) is provided to a mixer 15a through the LPF 14a. Also, an electric signal output from the CDR 17b (second recovered signal) is provided to the mixer 15a through the LPF 20a.

Similarly, optical phase error detection unit IB includes LPF 14b, 20b, and 21b, a mixer 15b, and ADC 22b. An electric signal output from the TIA 13b (second demodulated signal) is provided to the mixer 15b through the low-pass filter 14b. Also, an electric signal output from the CDR 17a (first recovered signal) is provided to the mixer 15b through the LPF 20b.

The cut-off frequencies of the LPF 14a, 14b, 20a, and 20b are about 100 MHz, for example.

In the optical phase error detection unit IA, the mixer 15a multiplies output signals of the LPF 14a and the LPF 20a. Similarly, in the optical phase error detection unit IB, the mixer 15b multiplies the output signals of LPF 14b and the LPF 20b.

High frequency components of electrical signals output from the mixers 15a and 15b are eliminated by the LPFs 21a and 21b, respectively. An A-branch monitor signal and a B-branch monitor signal output from the LPFs 21a and 21b, respectively, are converted into a digital data by A/D converters (ADCs) 22a and 22b, respectively.

Thus, in the optical phase error detection unit IA, the mixer 15a multiplies the electric signal not processed by CDR 17a in the A-branch (the first demodulated signal) and the electric signal processed by CDR 17b in the B-branch (the second recovered signal). Similarly, in the optical phase error detection unit IB, the mixer 15b multiplies the electric signal not processed by CDR 17b in the B-branch (the second demodulated signal) and the electric signal processed by CDR 17a in the A-branch (the first recovered signal).

A microcontroller 23a calculates a digital signal output from the A/D converter 22a and generates a phase adjustment signal for the A-branch. Similarly, a microcontroller 23b calculates from a digital signal output from the A/D converter 22b and generates a phase adjustment signal for the B-branch. The microcontrollers 23a and 23b are not necessarily separated ones, and may be a common controller.

The abnormal state detection unit 300 has the same configuration as that of the optical phase error detection units IA, IB.

That is, the optical phase error detection unit IA is a functional unit for obtaining the multiplication result A from the output signal of the TIA 13a of the A-branch (the first demodulated signal) and the output signal of the CDR 17b of the B-branch (the second recovered signal). On the other hand, the phase error detection unit IB is a functional unit for obtaining the multiplication result B of the output signal from the TIA 13b of the B-branch (the second demodulated signal) and the output signal of the CDR 17a of the A-branch (the first recovered signal).

In contrast to that, the abnormal state detection unit 300 is a functional unit for obtaining a multiplication result C from the output signal of the TIA 13a of the A-branch (the first demodulated signal) and the output signal of the CDR 17a of the A-branch (the first recovered signal), and a functional unit for obtaining a multiplication result D from the output signal of the TIA 13b of the B-branch (the second demodulated signal) and the output signal of the CDR 17b of the B-branch (the first recovered signal).

In such a configuration, the multiplication results C and D in the abnormal state detection unit 300 are as follows.

The output C, which is the multiplication result from the output signal of the TIA 13a of the A-branch (the first demodulated signal) and the output signal of the CDR 17a of the A-branch (the first recovered signal), is at a positive voltage level during a normal state and 0 volt or a lowered voltage level during an abnormal state.

Similarly, the output D, which is the multiplication result from the output signal of the TIA 13b of the B-branch (the second demodulated signal) and the output signal of the CDR 17b of the B-branch (the second recovered signal), is at a positive voltage level during a normal state and 0 volt or under voltage level during an abnormal state.

In FIGS. 3A and 3B, a microcontroller 301 inputs the multiplication results A, B, C, and D of each functional unit described above and performs abnormality detection. The microcontroller 301 may be common to the microcontrollers 23a, 23b in the B-branch and the A-branch in FIG. 3A.

A microcontroller 23a calculates a digital signal output from the A/D converter 22a and generates a phase adjustment signal for the A-branch. Similarly, a microcontroller 23b calculates from a digital signal output from the A/D converter 22b and generates a phase adjustment signal for the B-branch. The microcontrollers 23a and 23b are not necessarily separated ones, and may be a common controller.

The phase adjustment signals generated by the microcontrollers 23a and 23b are converted into analog signals and provided to heaters 24a and 24b, respectively.

In the A-branch, temperature of a phase-shift element in the delay interferometer 11a is adjusted by the heater 24a controlled by the microcontroller 23a. In the B-branch, temperature of a phase-shift element in the delay interferometer 11b is adjusted by the heater 24b controlled by the microcontroller 23b. The temperatures of the phase shift elements in the interferometer 11a and the interferometer 11b are adjusted separately.

As phase-shift amounts of the phase-shift elements of the delay interferometers 11a and 11b depend on temperature, the phase-shift amounts of the phase-shift elements of the delay interferometers 11a and 11b are adjusted by the phase adjustment signals generated by the microcontrollers 23a and 23b, respectively.

A temperature detector 25 detects a temperature around the delay interferometers 11a and 11b. A temperature control circuit 26 generates a temperature control signal based on a detection result of the temperature detector 25. A Peltier device 27 changes the temperature around the delay interferometers 11a and 11b, based on the temperature control signal. As the temperature control circuit 26 generates the temperature control signal for maintaining the temperature around the delay interferometers 11a and 11b to a predetermined value, the Peltier device 27 maintains the temperature around the delay interferometers 11a, 11b at a predetermined temperature according to the temperature control signal.

The Peltier device 27 is used for supplemental temperature control device to control the temperatures of the phase-shift elements in the delay interferometers 11a and 11b. Therefore, if temperature control for the phase-shift amounts of the phase-shift elements in the delay interferometer 11a and 11b can be done only by the heaters 24a and 24b, respectively, temperature control is done without the temperature detector 25, the temperature control circuit 26, or the Peltier device 27.

In the optical DQPSK receiver shown in FIG. 3A, when the phase error of the phase-shift element of the delay interferometer 11a is δA, the A-branch monitor signal is proportional to −sin(δA). Also, when the phase error of the phase-shift element of the delay interferometer 11b is δB, the B-branch monitor signal is proportional to −sin(δB).

Therefore, the microcontroller 23a controls the heater 24a such that the A-branch monitor signal output from the low-pass filter 21a becomes zero. Similarly, the microcontroller 23b controls the heater 24b such that the B-branch monitor signal output from the low-pass filter 21b becomes zero.

As described above, optical phase error detection unit IA and IB, including the mixers 15a and 15b, and the low-pass filters 21a and 21b, and the microprocessors 23a and 23b operate as a phase monitoring apparatus and a phase control apparatus.

In FIG. 3A, the phases of light of the optical phase modulated signals in the A-branch (I-branch) and the B-branch (Q-branch) are orthogonal. In performing signal extraction separately from the A-branch and the B-branch, when the optical phase control of the delay interferometer 11a (11b) is maintained in a target state, a discrimination output component of the output signal of CDR 17a (the first recovered signal) (or 17b/the second recovered signal) is not mixed into the output signal of the TIA 13b (the second demodulated signal) (or 13a/the first demodulate signal) of the B (or A)-branch, and therefore the output of the optical phase error detection unit (output of the A/D converter 22b (or 22a)) will become 0 [V].

Moreover, logic inversion circuits 210a, 211a (210b, 211b) are provided between the LPFs 14a, 20a (14b, 20b) and the mixer 15a (15b), which have an integration function in the phase error detection units IA, IB. Similarly, a logic inversion circuit is provided in the functional unit for detecting and notifying an abnormal state 300 as well.

This is because an optical phase error detection value is feeble, and the DC offset voltage generated in the circuit components used for the phase error detection unit is not negligible. Therefore, DC offset elimination processing is performed through computation by the microcontroller 301 of a total of four kinds of outputs A, B, C, and D which are obtained by subjecting each of the TIA outputs and the CDR outputs to logic conversion/inversion and multiplication.

Figure 4:
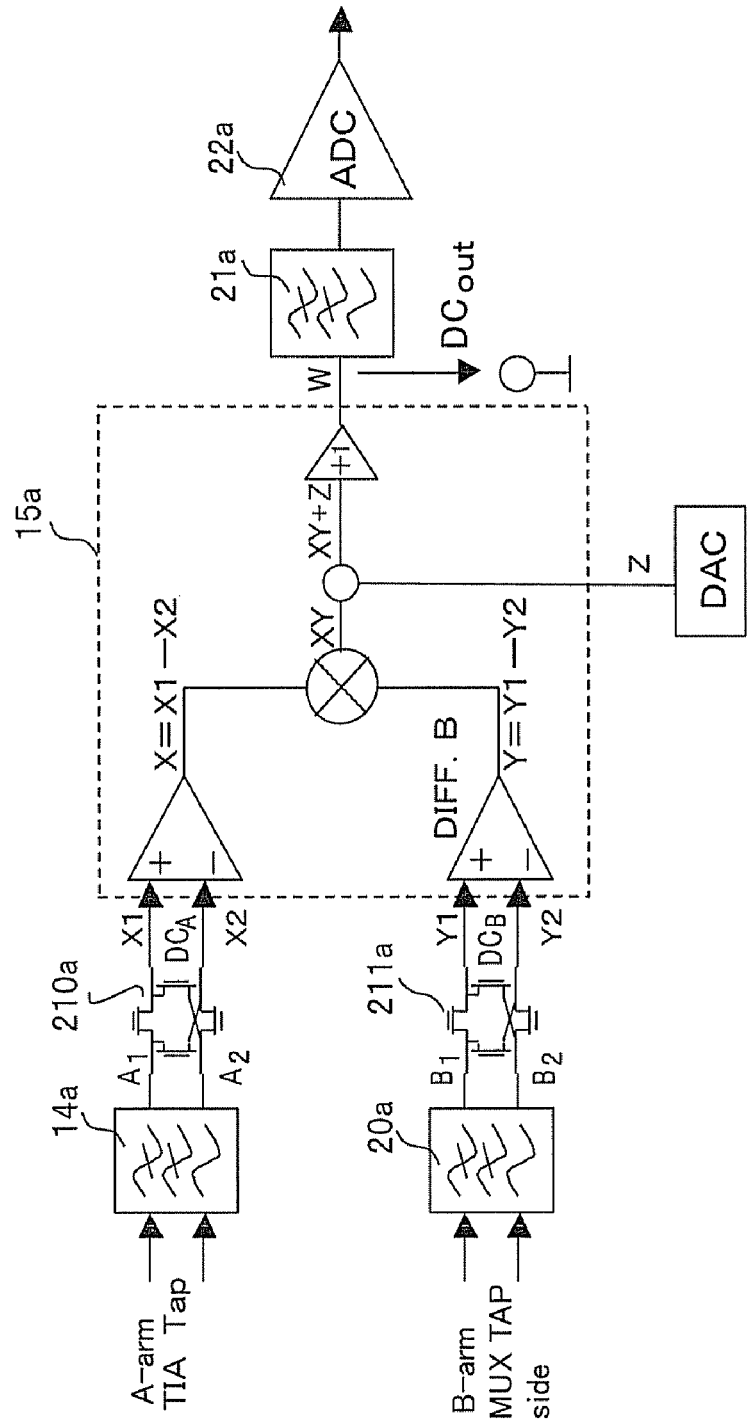
FIG. 4 is a diagram showing a DC offset elimination processing of a phase detection unit.

FIG. 4 is a detailed drawing to illustrate the above described matter; there is shown as the representative only the A-branch which includes Bessel LPFs 14a, 20a, analog switches 210a, 211a as the logic inversion circuit, a mixer 15a, a LPF 20a, and an A/D converter 22a of FIG. 3.

In FIG. 4, the output of the TIA 13a is subjected to the LPF 14a to provide a differential output A1−A2, and the output of the CDR 17b is subjected to the LPF 29a to provide a differential output B1−B2.

Let the DC offset voltages at the input/output units of the mixer 15a be respectively $DC_A$, $DC_B$, and $DC_{out}$ as shown in FIG. 4. Further letting the optical phase error detection outputs, which are obtained through the logic conversion/inversion processing (polarity inversion processing), performed by controlling the analog switches 210a, 211a by microcontroller 301, be W1 to W4 respectively, the outputs of the mixer 15a will be given as follows.

The output will take the following four values:

$$W1 = DC_{out} + (A1 - A2 + DC_A)(B1 - B2 + DC_B)$$

$$W2 = DC_{out} + (A2 - A1 + DC_A)(B1 - B2 + DC_B)$$

$$W3 = DC_{out} + (A2 - A1 + DC_A)(B2 - B1 + DC_B)$$

$$W4 = DC_{out} + (A1 - A2 + DC_A)(B2 - B1 + DC_B)$$

By using these four values, the following computation is performed by the microcontroller 301.

Thus, the result is given as W1+W2+W3+W4=4(A1−A2)(B1−B2) showing that providing inversion switches 210a, 211a as shown in FIGS. 3 and 4 makes it possible to eliminate DC offset generated in the circuit.

Figure 5A:
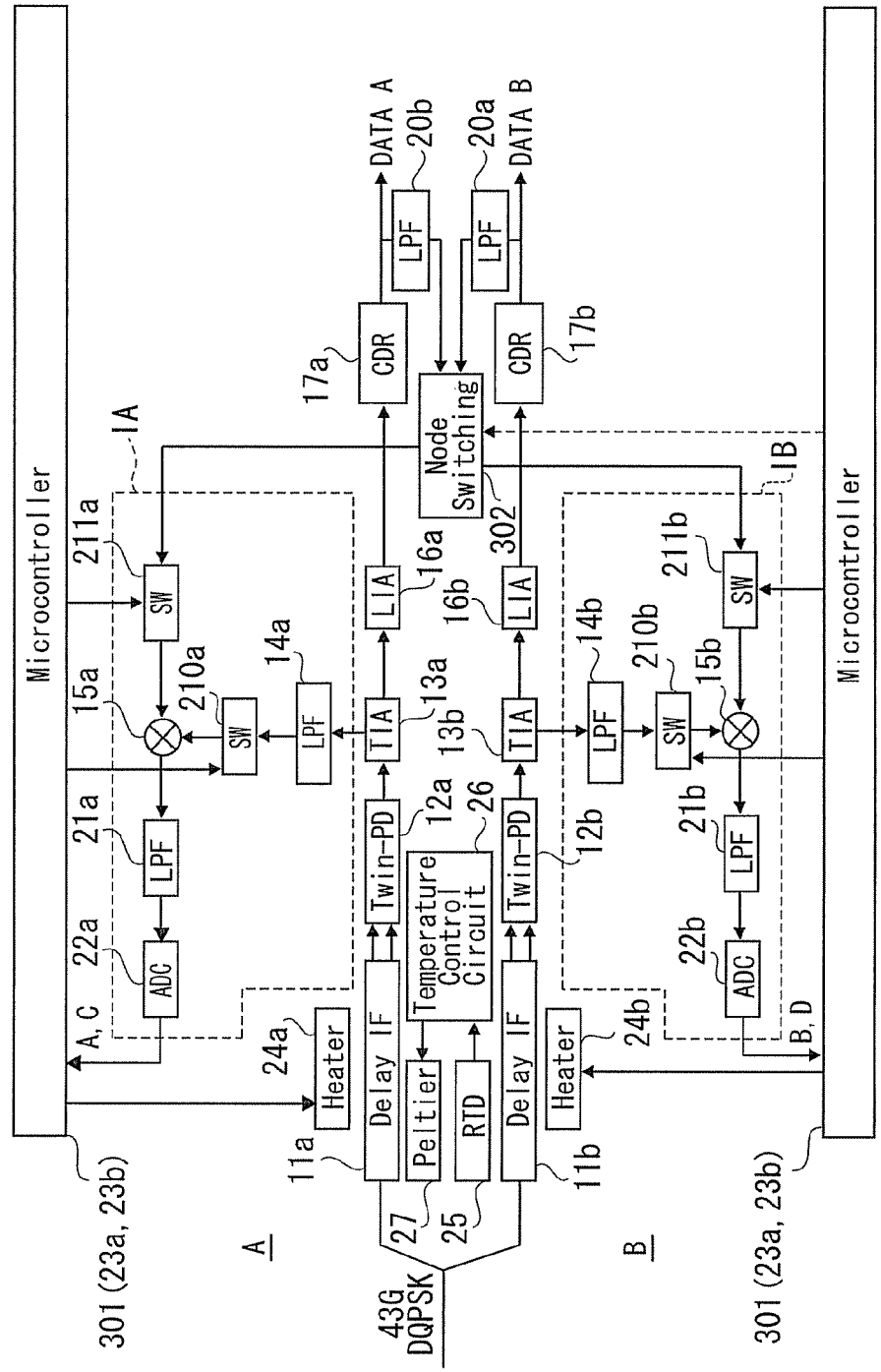
FIG. 5A and FIG. 5B are block diagrams showing a configuration of an embodiment.
Figure 5B:
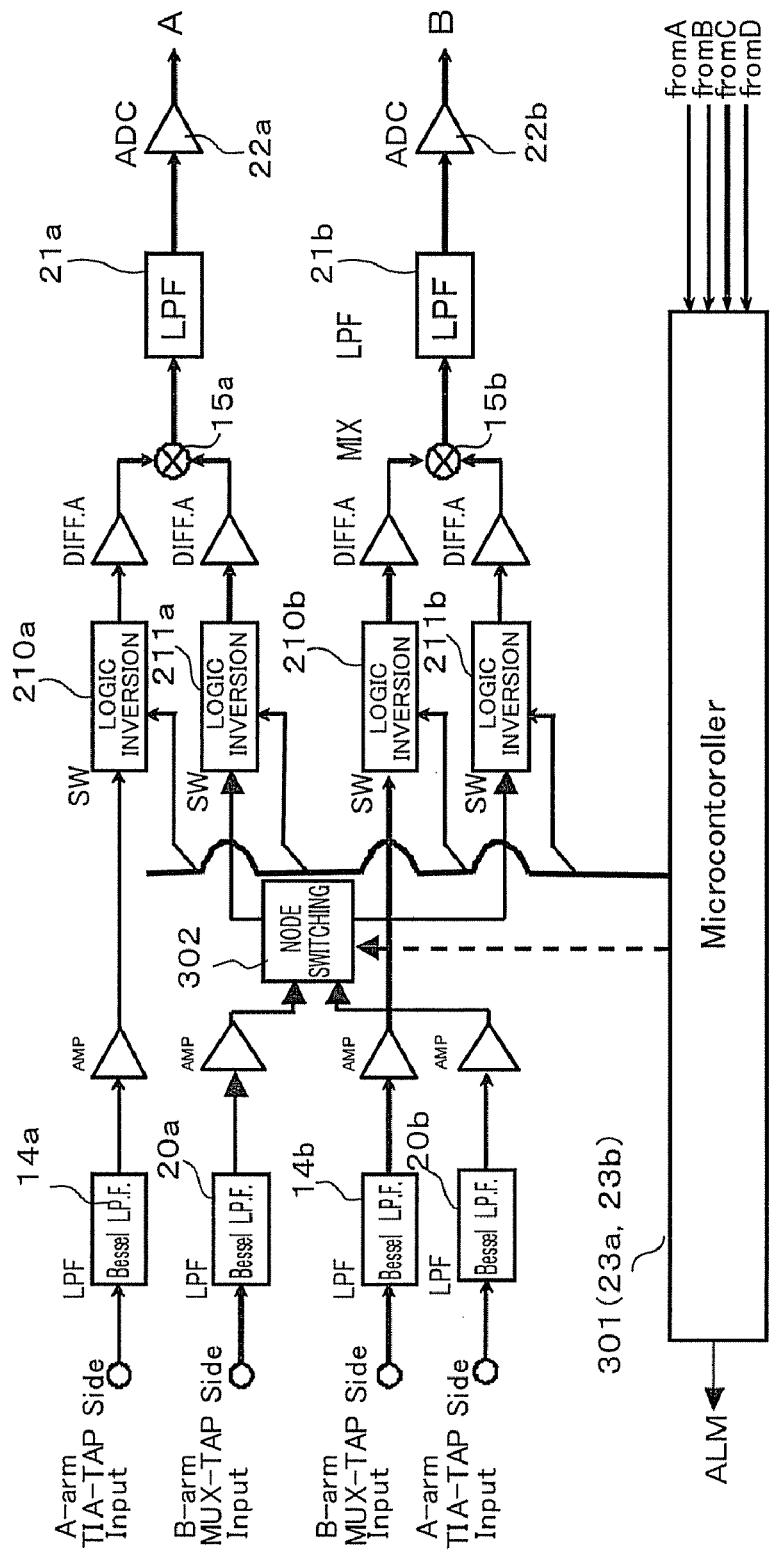

FIG. 5A and FIG. 5B are block diagrams showing a configuration of another embodiment. In contrast to the configuration of FIG. 3A and FIG. 3B, in this embodiment, a node-switching circuit 302 is provided and abnormal state detection unit 300 is not provided. Thus, by controlling the node-switching circuit 302 through the microcontroller 301 so as to function the optical phase error detection unit for optical phase error detection or abnormal state detection by time division, it simplifies the circuit configuration.

Figure 6:
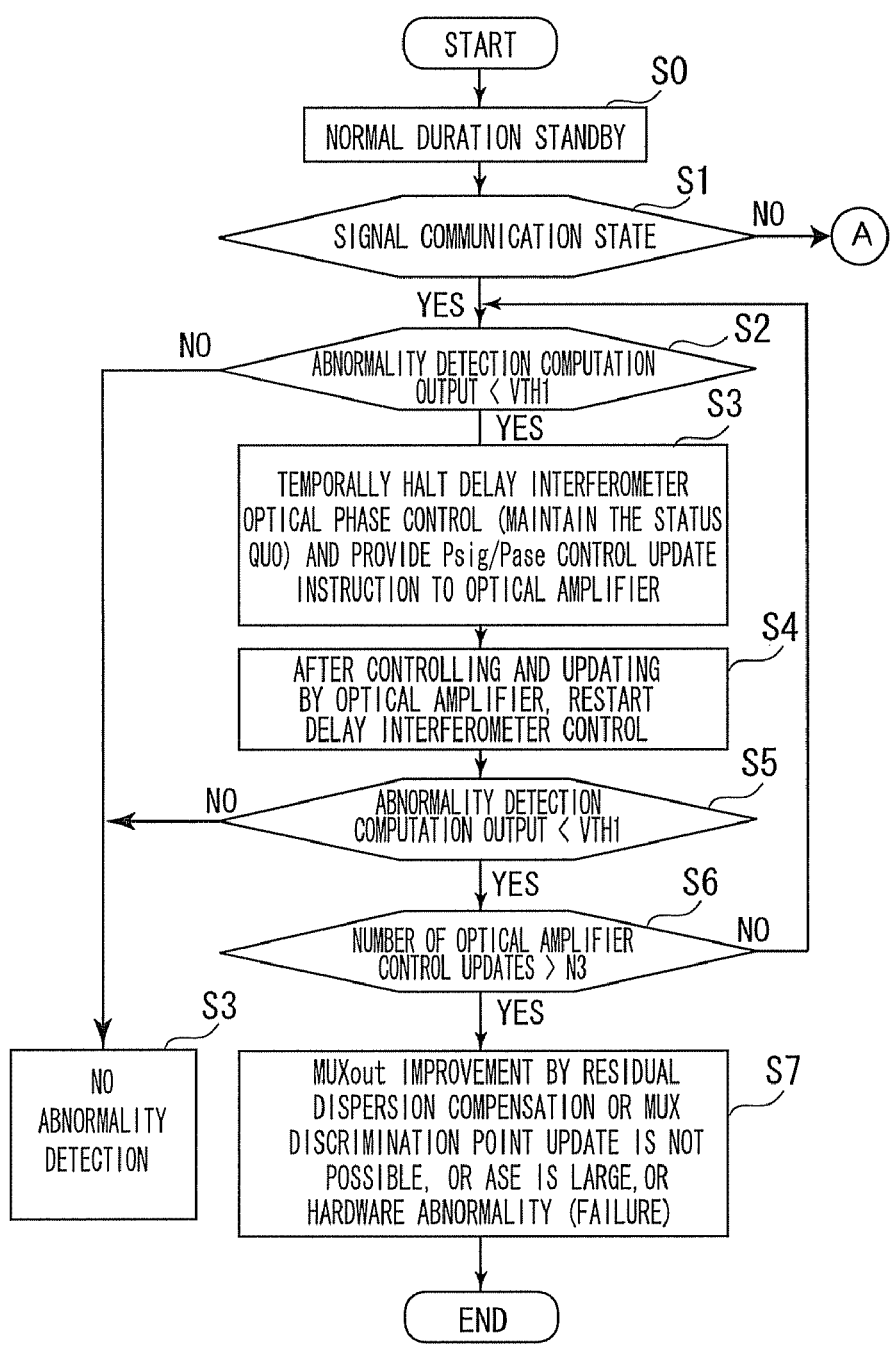
FIG. 6 is a flow chart of detecting and notifying an abnormality corresponding to Case 1.

FIGS. 6 and 7 show the operational processing flow of a functional unit for detecting and notifying an abnormal state 300 corresponding to the Cases 1 to 5 described above, which cause problems in the related art configurations, described in FIG. 2 for example.

Hereinafter, referring to such operational flow, the operation of embodiments according to the present invention in the Cases 1 to 5 will be described.

First, temperature of the phase-shift elements in the delay interferometers 11a and 11b are stabilized by utilizing the heaters 24a, 24b (step S0). Next, it is judged whether or not there is a signal communication (step S1) in the processing circuit of data A and data B, which is positioned aft-stage of the CDR 17a, 17b and which is not shown in FIG. 5A.

The absence of signal communication indicates a state in which there is no incoming signal, and the presence of signal communication is a state in which a signal with an error rate Pe of at least not less than about $10^{-2}$ is obtained regardless of the signal quality.

(Case 1)

When it is judged that there is signal communication (Yes at step S1), if the abnormality detection operation output value determined by the microcontroller 301 from the signal determined by the abnormal state detection unit in FIG. 3A, 3B, 5A, or 5B is larger than a first threshold TH1 (No at step S2), it is judged that there is no abnormality detection (step S3).

Figure 8:
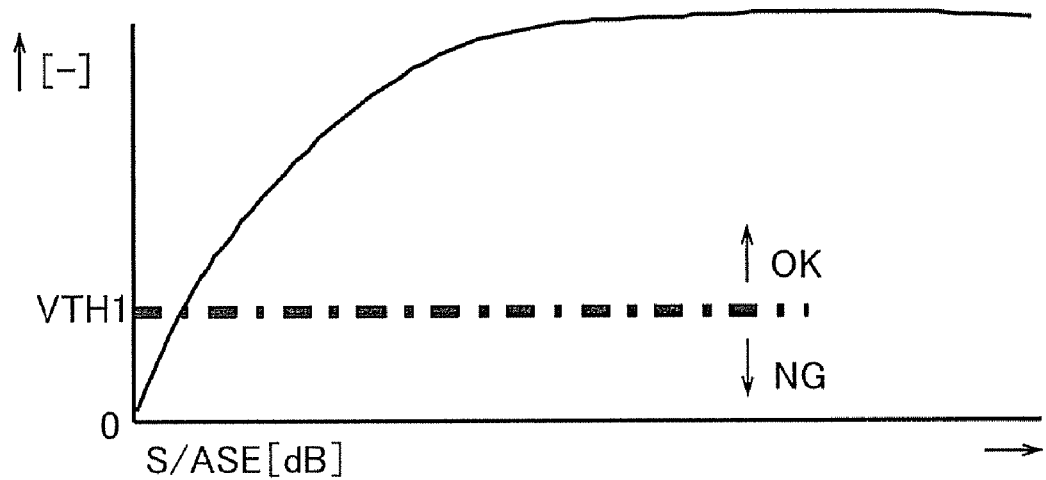
FIG. 8 is a diagram showing a threshold for the Case 1.

FIG. 8 illustrates the threshold for the Case 1. That is, Case 1 is a case in which the received optical input is the ASE light alone and does not include an optical phase modulated signal, or a case in which S/ASE ratio is extremely small to an extent that the term (n*B(A)-arm TIA OUT)×(A(B)-arm MUX OUT) described above (hereinafter, simply referred to as * term) cannot be detected.

In FIG. 8, with an abscissa being S/ASE [dB], there are shown on the ordinate the multiplication results C and D; that is, the values represented by the following expressions respectively:

(A-arm TIA OUT×A-arm)/Rx_POW_MON_A (B-arm TIA OUT×B-arm MUX OUT)/Rx_POW_MON_B

The numerator of the above equation is a synchronized detection output of the output signal of the TIA 13a (the first demodulation signal) (13b/the second demodulation signal) of A (B) arm and the output signal (MUX OUT) of the CDR 17a (the first recovered signal), (17b/the second recovered signal); the denominator of the above equation is an optical input power monitor value; and the entire term of numerator/denominator indicates the value processed by the microcontroller 301.

Then, considering that the optical input power [mW] is proportional to the TIA output, the synchronized detection output of the same branch (Arm) is divided by the optical input power monitor value so that normalized output is indicated on the ordinate.

Further, since the numerator acts on the input signal optical power S [mW], and the denominator acts on the total optical power (S+ASE) [mW], an S/ASE abnormality judgment threshold VTH1 is set from allowable S/ASE using the characteristics that the output will vary in the ratio of S[mW]/(S+ASE)[mW].

However, this requires a premise that the judgment threshold VTH1 is a threshold by which S/ASE ratio abnormality can be judged when there is no other abnormality.

Referring back to FIG. 6, if the input signal optical power S is larger than the S/ASE abnormality judgment threshold VTH1 (No at step S2), no abnormality is detected (step S3).

On the other hand, if the input signal optical power S is not larger than the S/ASE abnormality judgment threshold value VTH1 during abnormality detection operation (Yes at step S2), it is judged to be abnormal and the control of the delay interferometer 11a (11b) by the microcontroller 23a (23b) is temporally halted, that is, the status quo is maintained, thereby causing the optical amplifier AMP on the optical transmission line 3 to perform control to decrease the input light and update the Psig/Pase ratio (step S3).

Thus, control is performed such that a control signal is inserted into a predetermined channel from the receiver and sent towards the transmitter, and the ratio of the signal light level to the ASE light level (Psig/Pase) is updated at each optical amplifier AMP.

Based on such control, control of the delay interferometer is restarted after the control and updating at the optical amplifier AMP (step S4).

After restarting the control of delay interferometer, abnormality detection operation is further performed as with the step S2 described above, to make judgment with reference to the threshold VTH1 (step S5).

Then, when the number of updates of the optical amplifier control as described above becomes larger than N3 for example (Yes at step S6), it is judged that discrimination improvement by the discrimination circuit (CDR) 17a, 17b becomes impossible or there is a hardware fault, and an alarm ALM is output from the microcontroller 301 (step S7).

(Case 2)

Case 2 is a case in which because of large waveform distortion, the optical input becomes a signal with an error rate Pe of not larger than $10^{-2}$.

Therefore, in such a case, it is judged that there is no signal communication at the signal communication state judgment in FIG. 6, (No at step S1). Then, processing advances by moving to the flow of FIGS. 7A and 7B.

That is, the case in which the output MUX OUT of the discrimination circuit 17a (17b) in the above described * term becomes indeterminate.

Figure 9:
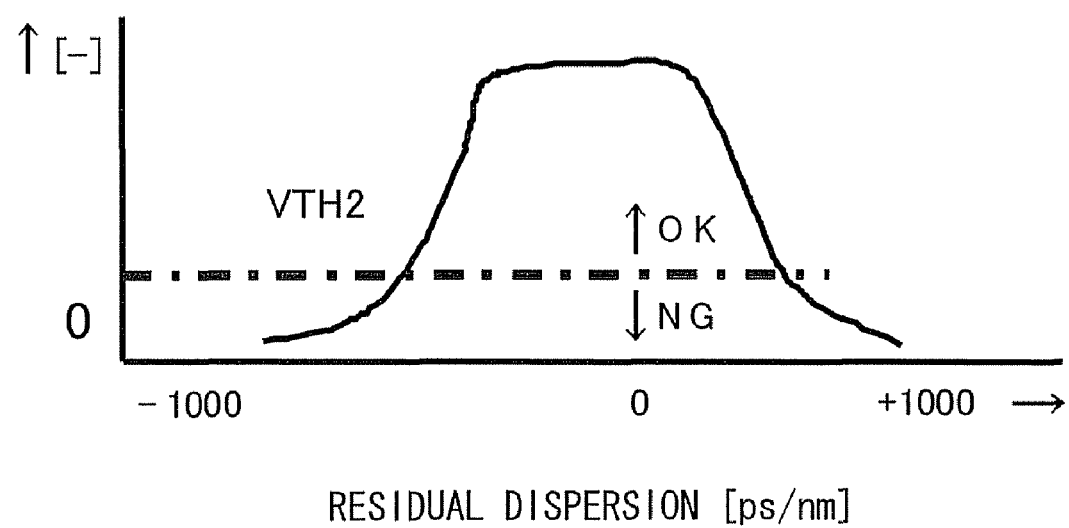
FIG. 9 is a diagram showing a threshold for the Cases 2 and 3.

In FIG. 9, with the abscissa being the chromatic dispersion, there are shown on the ordinate the multiplication results C and D as with FIG. 8; that is, the values represented by the following equation:

(A-arm TIA OUT×A-arm MUX OUT)/Rx_POW_MON_A (B-arm TIA OUT×B-arm MUX OUT)/Rx_POW_MON_B When the data discrimination in the discrimination circuit (CDR) 17a (17b) has been extremely degraded (when the error rate becomes extremely large), due to the waveform distortion including residual dispersion, the above described term (MUX OUT) becomes indeterminate and the numerator converges to zero.

The effect of error rate of the MUX OUT term, which is the output of the discrimination circuit 17a (17b), on the ordinate of FIG. 9 will be the error rate itself. Thus, when the error rate is given as Pe=$10^{-2}$, the likelihood of the MUX OUT term will be reduced at the rate of $10^{-2}$ thereby affecting the ordinate.

Further, the trans-impedance amplifier output (TIA OUT) has a high residual dispersion resistance since the bandwidth of the linear amplified signal of input signal is limited by the LPF (Bessel Fil) 14a (14b).

In FIG. 9, considering the loop gain of the feedback control of the delay interferometer optical phase, the lower limit value due to waveform distortion for normal functioning is set to be a threshold VTH2.

However, this threshold VTH2 requires a premise that it is a threshold by which waveform distortion abnormality can be judged when there is no other abnormality.

Figure 7A:
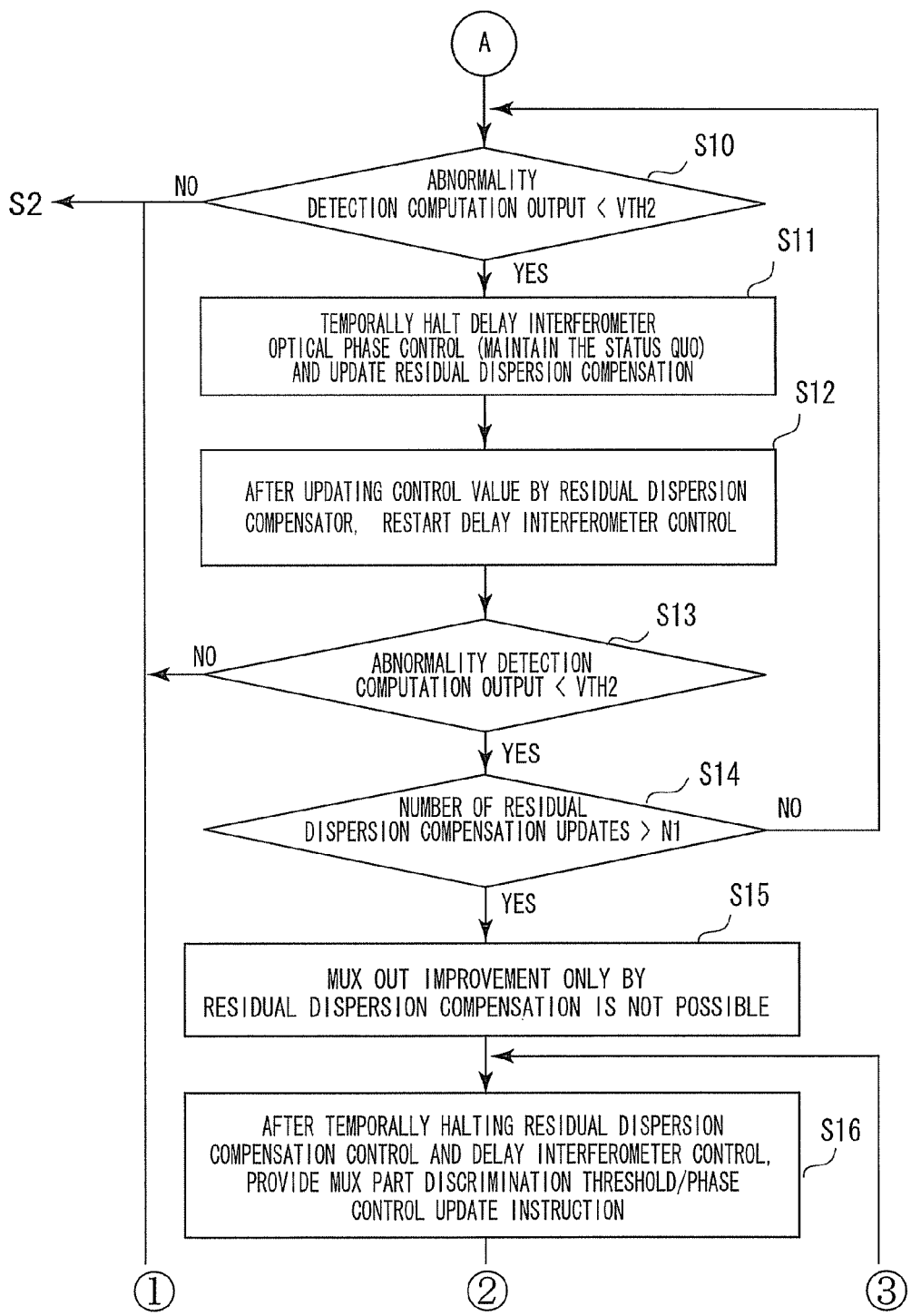
FIGS. 7A and 7B are flow chart of detecting and notifying abnormalities corresponding to the Cases 2 and 3.
Figure 7B:
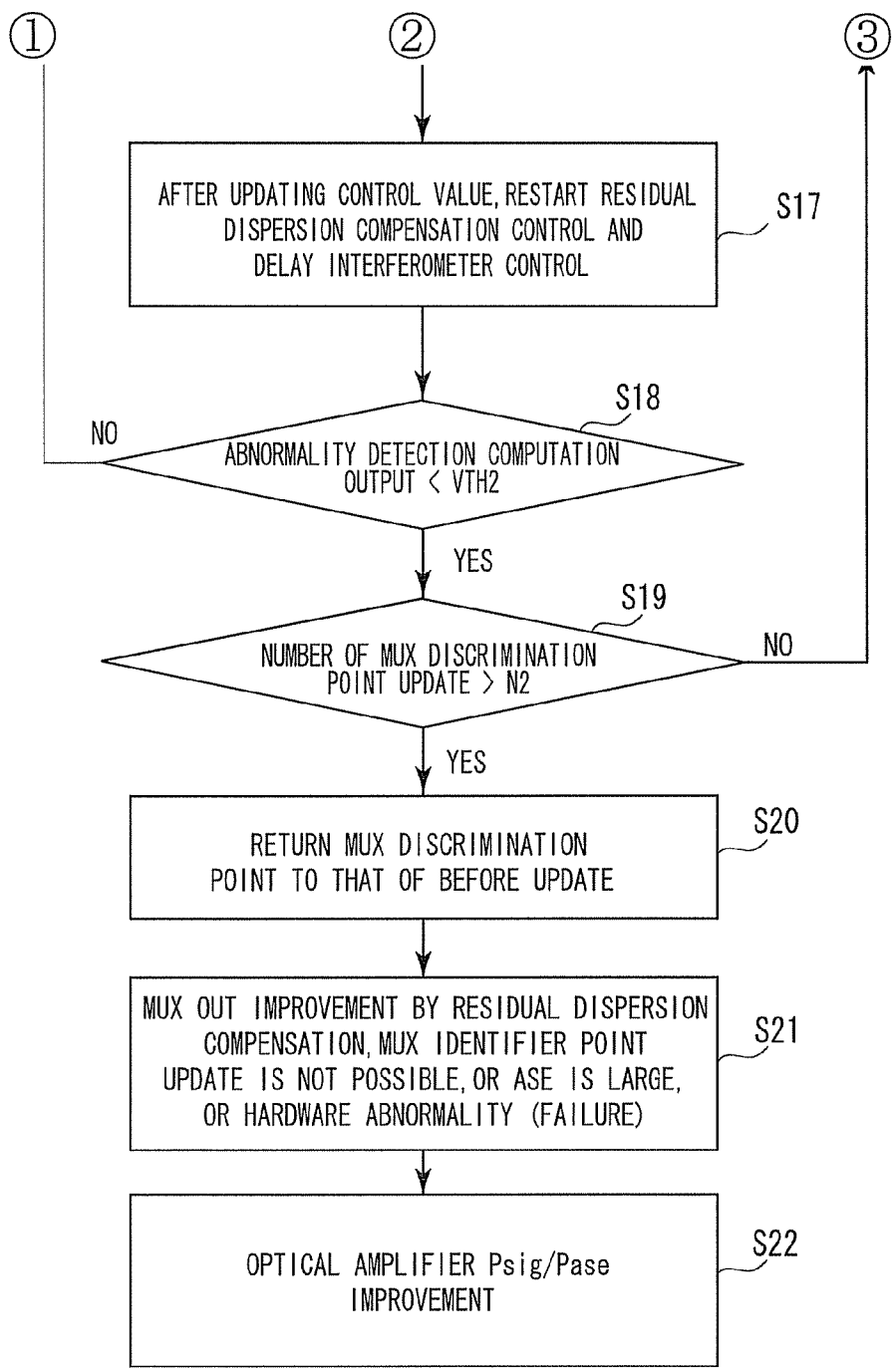

Referring to FIGS. 7A and 7B, during the abnormality detection computation by the microcontroller 301, if the above described multiplication result C or D is larger than judgment threshold VTH2 with respect to the residual dispersion of the input signal optical power (No at step S10), the process returns to the judgment of Case 1 of FIG. 6 described above.

On the contrary, when the multiplication result C or D is smaller than the judgment threshold VTH2 (Yes at step S10), the control of the delay interferometer 11a (11b) by the microcontroller 23a (23b) is temporally halted, that is, the status quo is preserved, and the dispersion compensator 6 on the network 3 is updated (step S11).

After the dispersion compensation value is updated by the dispersion compensator 6, control on the delay interferometer 11a (11b) is restarted (step S12).

After restarting control of the delay interferometer, further abnormality detection computation is performed as with the above described step S2, and judgment is made with reference to the threshold VTH2 (step S13).

When the computation result output C or D described above is larger than the threshold VTH2, the process returns to the judgment of Case 1 previously described in FIG. 6 (No at step S13).

Then, when the number of judgments that the computation result output C or D is smaller than the threshold VTH2 becomes larger than N1 (Yes at step S14), it is judged that improvement of the discrimination circuit (CDR) 17a (17b) only by the dispersion compensator 6 is not possible (NG) (step S15).

(Case 3)

In Case 3, in a similar fashion with Case 2, when the output of the discrimination circuit (CDR) 17a, 17b becomes indeterminate due to the threshold abnormality thereof in a similar fashion with Case 2, the processing is as follows.

That is, in FIGS. 7A and 7B, the dispersion compensation control by the dispersion compensator 6 and the phase control on the delay interferometer 11a (11b) are temporally halted, and thereafter the threshold of the discriminator (CDR) 17a (17b) and the phase control are updated (step S16).

Then, after the update of control value, control on the dispersion compensator 6 and phase control on the delay interferometer 11a (11b) are restarted (step S17).

Then, when the number of judgments that computation result output C or D is smaller than the threshold VTH2 becomes larger than N2 (Yes at step S19), the discrimination point of the discrimination circuit (CDR) 17a (17b) is returned to the original state (step S20), and it is judged that improvement of the dispersion compensation by the dispersion compensator 6 and the discrimination output by the update of the threshold of the discrimination circuit (CDR) 17a (17b) is not possible (step S21).

In such a case, since ASE light is large, or the hardware is abnormal, a countermeasure is taken by improving the signal to ASE ratio of the optical amplifier AMP on the network 3 (step S22).

(Case 4 and Case 5)

Case 4 is a case in which either of the output signal of the trans-impedance amplifier (TIA) (the first/second demodulated signal) or the output signal of the discrimination circuit (CDR) 17a (17b) (the first/second recovered signal) is abnormal, and in which the control value updating processing in the above described Cases 1 to 3 will not allow recovery. That is, it is judged that the optical input power monitor value is normal and any of input light loss detection unit or fore-stage units before the interferometers is likely to be in fault.

Further, in Case 5, when output of the abnormal state detection unit is abnormal and shows no change during a series of abnormality detection control flow of the above described Cases 1 to 3, it is judged that input light loss detection unit is likely to be in failure regardless of the failure judgment of other units in Case 4.

As described above, utilizing a circuit for detecting and notifying an abnormal state, a runaway of the feedback control of the delay interferometer optical phase is prevented. Also, utilizing an abnormality detection computation and control unit, the dispersion compensator, the optical amplifier, and others are halted during abnormality and recovered therefrom upon detection of abnormality.

In the control procedure for the above described abnormality recovery, as the abnormalities can happen at the same time, it is preferable to recover the abnormalities and avoid the abnormalities affecting the dispersion compensation amount feedback control of the dispersion compensator in the optical receiver unit or the delay interferometer optical phase feedback control embedded in the optical receiver in order to avoid runaway.

Thereafter, abnormality recovery control is performed in which abnormality recovery is performed by time division so that abnormality judgment is recovered on the abnormality occurrence causes.

Then, from a series of the results of abnormality detection control which is performed by such time division, abnormality occurrence locations are identified.

Although a few preferred embodiments of the present invention have been shown and described, it would be appreciated by those skilled in the art that changes may be made in these embodiments without departing from the principles and spirit of the invention, the scope of which is defined in the claim and their equivalents.

What is claimed is:

1. An optical apparatus comprising:
a branching unit branching an input optical signal modulated by DQSPK format and thereby outputting a first branched light and a second branched light;
a first interferometer having a first phase shifting unit that shift an optical phase of part of the first branched light and thereby outputting a first interfered light;
a first photo detector converting the first interfered light to a first demodulated signal;
a first discriminator recovering the first demodulated signal and thereby outputting a first recovered signal;
a second interferometer having a second phase shifting unit that shift an optical phase of part of the second branched light and thereby outputting a second interfered light;
a second photo detector converting the second interfered light to a second demodulated signal;
a second discriminator recovering the second demodulated signal and thereby outputting a second recovered signal;
a first phase control unit controlling the first phase shifting unit based on the first demodulated signal and the second recovered signal;
a second phase control unit controlling the second phase shifting unit based on the second demodulated signal and the first recovered signal; and
a abnormality detection unit detecting abnormality based on a synchronized detection of the first demodulated signal and the first recovered signal, and a synchronized detection of the second demodulated signal and the second recovered signal, wherein,
the abnormality detection unit further comprises a plurality of inversion circuits switching a polarity of the first demodulated signal, the first recovered signal, the second demodulated signal, and the second recovered signal, and
the abnormality detection unit switching the polarity of the first demodulated signal, the first recovered signal, the second demodulated signal, and the second recovered signal on the synchronized detection.

2. An optical apparatus comprising:
a branching unit branching an input optical signal modulated by DQSPK format and thereby outputting a first branched light and a second branched light;
a first interferometer having a first phase shifting unit that shift an optical phase of part of the first branched light and thereby outputting a first interfered light;
a first photo detector converting the first interfered light to a first demodulated signal;
a first discriminator recovering the first demodulated signal and thereby outputting a first recovered signal;
a second interferometer having a second phase shifting unit that shift an optical phase of part of the second branched light and thereby outputting a second interfered light;
a second photo detector converting the second interfered light to a second demodulated signal;
a second discriminator recovering the second demodulated signal and thereby outputting a second recovered signal;
a first phase control unit controlling the first phase shifting unit based on the first demodulated signal and the second recovered signal;
a second phase control unit controlling the second phase shifting unit based on the second demodulated signal and the first recovered signal;
a abnormality detection unit detecting abnormality based on a synchronized detection of the first demodulated signal and the first recovered signal, and a synchronized detection of the second demodulated signal and the second recovered signal; and
a switching unit connected to the first phase control unit and the second control unit, inputting the first recovered signal and the second recovered signal, being capable of outputting the first recovered signal or the second recovered signal to the first phase control unit and the second control unit, respectively, wherein,
the first phase control unit controls the first phase shifting unit when the second recovered signal is input from the switching unit,
the second phase control unit controls the second phase shifting unit when the first recovered signal is input from the switching unit,
the first phase control unit and the second phase control unit makes the abnormality detection when the first recovered signal is input from the switching unit to the first phase control unit and the second recovered signal is input from the switching unit to the second phase control unit.

3. An optical apparatus comprising:
a branching unit branching an input optical signal modulated by DQSPK format and thereby outputting a first branched light and a second branched light;
a first interferometer having a first phase shifting unit that shift an optical phase of part of the first branched light and thereby outputting a first interfered light;
a first photo detector converting the first interfered light to a first demodulated signal;
a first discriminator recovering the first demodulated signal and thereby outputting a first recovered signal;
a second interferometer having a second phase shifting unit that shift an optical phase of part of the second branched light and thereby outputting a second interfered light;
a second photo detector converting the second interfered light to a second demodulated signal;
a second discriminator recovering the second demodulated signal and thereby outputting a second recovered signal;
a first phase control unit controlling the first phase shifting unit based on the first demodulated signal and the second recovered signal;
a second phase control unit controlling the second phase shifting unit based on the second demodulated signal and the first recovered signal; and
a abnormality detection unit detecting abnormality based on a synchronized detection of the first demodulated signal and the first recovered signal, and a synchronized detection of the second demodulated signal and the second recovered signal, wherein,
the abnormality detection unit judges abnormality based on a ratio of a first synchronization detection signal, output from the synchronized detection of the first demodulated signal and the first recovered signal, to a level of input light, or a ratio of a second synchronization detection signal, output from the synchronized detection of the second demodulated signal and the second recovered signal, to a level of input light.

4. The optical apparatus according to claim 3, wherein, the abnormality detection unit judges abnormality on a ratio of signal light and ASE light in the input light when the ratio of the first synchronization detection signal to the level of the input light or the ratio of the second synchronization detection signal to the level of the input light is exceeding a first threshold level.

5. The optical apparatus according to claim 3, wherein, the abnormality detection unit judges abnormality on a distortion of the input light when other reason of abnormalities are not found and when the ratio of the first synchronization detection signal to the level of the input light or the ratio of the second synchronization detection signal to the level of the input light is below a second threshold level.

* * * * *